United States Patent [19]

Dolby

[11] 4,223,188
[45] Sep. 16, 1980

[54] SCANNING SYSTEM FOR REPRODUCTION OF OPTICAL SOUND TRACKS WITH CLEAR AREA NOISE DISCRIMINATOR DELAY MEANS

[75] Inventor: Ray M. Dolby, San Francisco, Calif.

[73] Assignee: Dolby Laboratories, Inc., San Francisco, Calif.

[21] Appl. No.: 778,870

[22] Filed: Mar. 18, 1977

Related U.S. Application Data

[63] Continuation-in-part of Ser. No. 603,671, Aug. 11, 1975, abandoned.

[51] Int. Cl.$^2$ .................................................. G11B 7/00
[52] U.S. Cl. ...................... 179/100.3 A; 179/100.3 R
[58] Field of Search ................ 179/100.3 R, 100.3 A, 179/100.3 GN; 358/127, 130, 131, 132, 199, 202, 204, 214, 215, 216

[56] References Cited

U.S. PATENT DOCUMENTS

| | | | |
|---|---|---|---|
| 2,025,027 | 12/1935 | Donle | 358/204 |
| 2,049,384 | 7/1936 | Hogan | 358/214 |
| 2,184,525 | 12/1939 | Ives | 358/202 |
| 2,347,084 | 4/1944 | Cooney | 179/100.3 A |
| 2,485,829 | 10/1949 | Holst et al. | 179/100.3 A |
| 2,538,869 | 1/1951 | Holst | 179/100.3 T |
| 2,575,445 | 11/1951 | Germer | 179/100.3 A |
| 3,138,669 | 6/1964 | Rabinow et al. | 179/100.3 A |

*Primary Examiner*—Raymond F. Cardillo
*Attorney, Agent, or Firm*—Robert F. O'Connell

[57] ABSTRACT

A variable area sound track is scanned laterally to derive width-modulated pulses which can be demodulated to audio. In order to eliminate the effect of noise on the clear area of the track, each pulse is initiated by a black-to-clear transition sensed in the scanning but is not terminated until it is certain that the clear-to-black transition has been reached, e.g. at reference instants of time.

5 Claims, 10 Drawing Figures

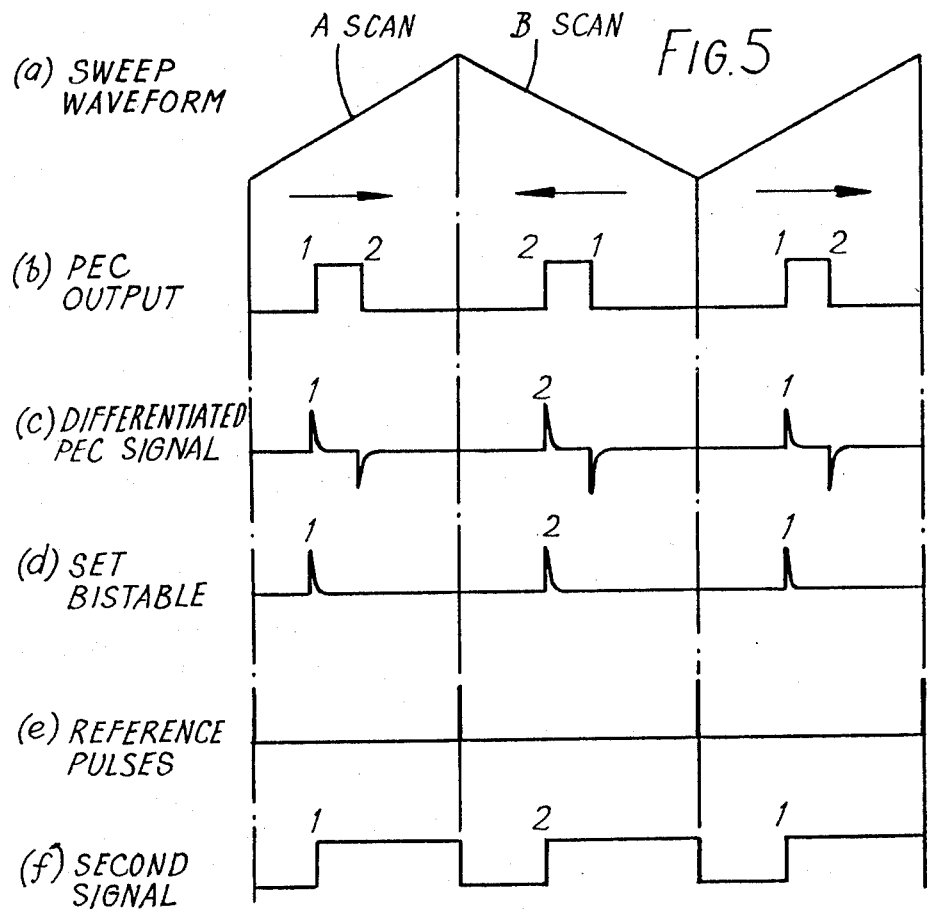
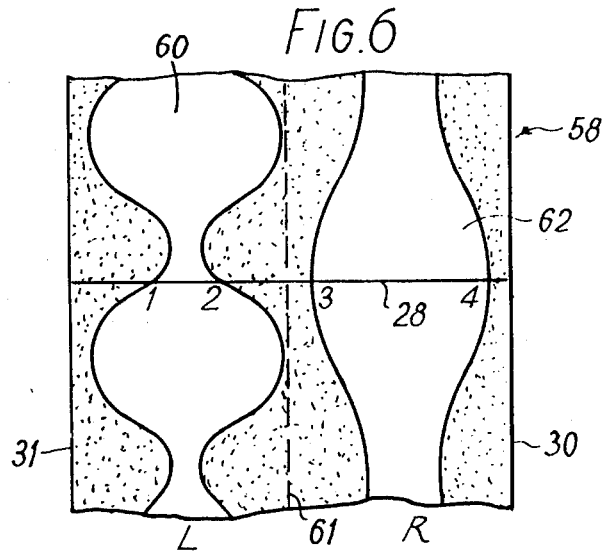

FIG. 7
(a) SWEEP WAVEFORM 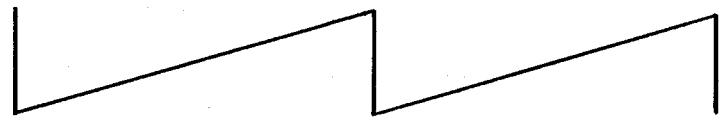
(b) PEC OUTPUT 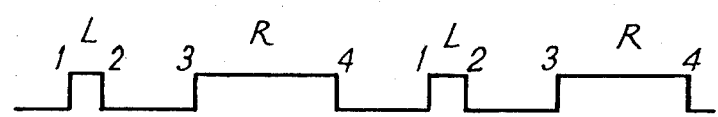
(c) LEFT CHANNEL GATE SIGNAL 
(d) RIGHT CHANNEL GATE SIGNAL 
(e) LEFT CHANNEL OUTPUT 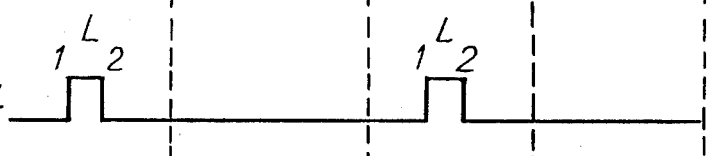
(f) RIGHT CHANNEL OUTPUT 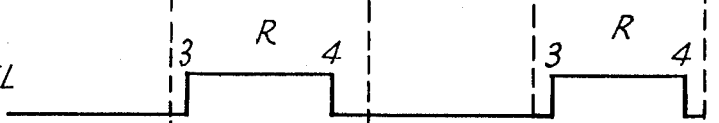
(g) LEFT CHANNEL REFERENCE PULSES 
(h) RIGHT CHANNEL REFERENCE PULSES 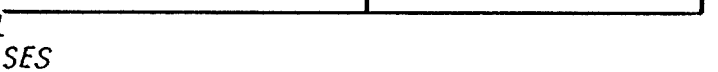

SCANNING SYSTEM FOR REPRODUCTION OF OPTICAL SOUND TRACKS WITH CLEAR AREA NOISE DISCRIMINATOR DELAY MEANS

This is a continuation-in-part of application Ser. No. 603,671, filed Aug. 11, 1975, now abandoned.

The present invention relates to the reproduction of variable area optical sound tracks. Conventionally, such tracks are scanned using a narrow slit of light and a photoelectric cell to generate a signal corresponding to the width-modulation of the variable area track. By magnetic recording standards, the signal to noise ratio of optical sound tracks is poor. Thus considerable problems lie in the way of extending the optical technique to multi-channel reproduction.

U.S. Pat. No. 2,347,084 describes a system in which the track is repeatedly scanned across its width with a very small scanning spot. A photoelectrically generated signal is then essentially a two-level signal whose duration corresponds to the width of the track. By integrating this signal with a suitable time-constant, it may be converted into an amplitude-varying audio signal. This known system goes some way to dealing with the problem of noise on variable area tracks, which usually takes the form of dark spots (dust, flakes due to film abrasion) on the clear area of the track or other variations in density of this area. The black areas flanking the track are comparatively noise-free. By limiting the two-level signal before it is integrated or otherwise demodulated, much noise is eliminated but some dark spots on the clear area will still introduce noise.

One object of this invention is to provide an improved system which effects an even better rejection of noise. Another object is to provide a system which is especially suited to reproduce dual-bilateral tracks with reduced noise. It is a further object to effect multi-channel reproduction with reduced noise.

The present invention employs a scanning system for reproducing a variable area optical sound track, comprising scanning means arranged to scan repeatedly across the width of the track to provide a two-level first electrical signal, which may be limited, in known way. The invention provides for the derivation of a second two-level signal from the first signal. The second electrical signal is set from a first level to a second level by a transition in the first signal occurring as the scanning means scan from a black area to a clear area of the track. In one practice of the invention the second signal is reset from the second level to the first level at reference instants independent of the first signal. For example, reference pulses synchronised to the scanning means can be used to effect the reset to the first level.

Since the second signal is set to the second level at a black-to-clear transition and the black area is much more noise-free than the clear area, the leading edge of the pulse at the second level is accurately timed in relation to the edge of the track. On the other hand, the reset to the first level is independent of the first signal. Noise in the clear area is thus completely ignored. With simple bilateral tracks the reset may be accomplished at the end of the scan. Although the symmetrically modulated first signal is converted by this procedure to a unilaterally modulated signal, this does not affect the recoverability of the modulating information. There is in fact a DC offset introduced by the procedure by a DC offset is readily removed by the use of AC coupling.

With dual-bilateral tracks, in which there are two black-to-clear transitions per scan, the reset can be accomplished by reference pulses synchronised to the scanning means. With such dual-bilateral tracks, which are most often used, the reference pulses can be regarded as corresponding to the scanning of hypothetical reference lines at the edge of and between the two bilateral tracks and parallel to the length of the track.

The second level pulses have a duration representing the track width from a black-to-clear edge to the next hypothetical reference line. As explained below, steps may be taken to ensure that these lines are positioned in predetermined locations, for instance exactly at the edge and down the centre of the track. Variation in position of the reference line may result in waveform distortion due to clipping of highly modulated signals. The variation in depth of modulation of the amplitude-varying audio signal may be derived in known manner from the second signal by known techniques for demodulating width-modulated pulses, of which integration is the best known example.

In order to reproduce multi-channel tracks, it is necessary only to use timing gates to select the channel signals from the appropriate tracks.

In an alternative practice of the invention the reset of the second signal is dependent on the first signal but is effected only when the first signal has reverted to the black state and has stayed continuously in that state for a predetermined start time of the order of 1 to 5% of the time taken to scan across the track. The second signal will not be reset by black spots in the clear area which do not cause the first signal to remain in the black state for as long as the predetermined time.

For convenience reference has been made to black and clear areas. There is some interest in sound tracks in which the "black" or opaque areas are actually coloured. This does not affect the applicability of the inventive scanning system.

Although, for simplicity, some described embodiments of the invention use flying spot scanning, it will be appreciated that this method is not essential. As is well known, scanning may either be on the illuminating side with full aperture photoelectric pick-up, as is the case using a flying spot scanner, or may be on the pick-up side with full aperture illumination, as is the case for example when using a Vidicon scanner. In addition, there are many known techniques, electronic and non-electronic, for generating the scanning movement, including mechanical-optical techniques such as those using rotating or oscillating prisms or mirrors or Nipkow discs. Systems of this nature may be preferred to the described use of a flying spot scanner because of the difficulty of obtaining adequate spot brightness at the high resolution required. It is also possible to scan on the input side with a laser beam deflected, say, by a piezo-electric deflector.

The invention will be described in more detail, by way of example, with reference to the accompanying drawings, in which:

FIG. 5 illustrates waveforms for another way of scanning the sound track;

FIG. 6 illustrates a dual-bilateral stereo sound track;

FIG. 7 illustrates waveforms for scanning the dual track;

Figure 1:
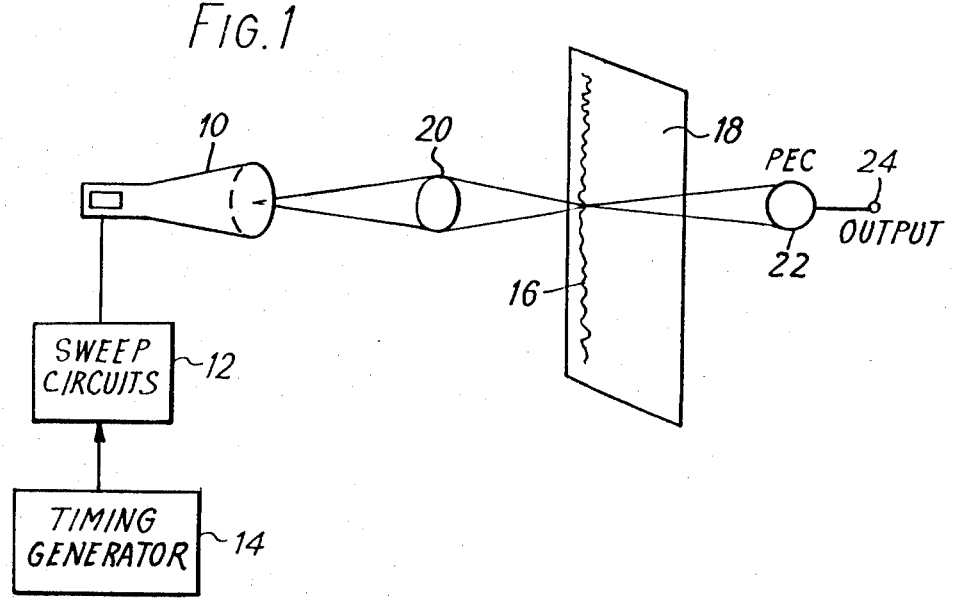
FIG. 1 is a schematic diagram of a basic scanning system.

FIG. 1 shows a scanning system in which a CRT flying-spot scanner 10 is subjected to X-deflection only under the control of a sweep circuit 12 synchronised to a timing pulse generator 14. The required scanning frequency is several times the highest audio frequency handled—e.g. it may be in the range 30 kHz-100 kHz. The time taken to effect one scan across the track will be of the order of 10 $\mu$S. An image of the flying spot is focused on the sound track 16 of a film 18 by a lens 20 to form a transverse scan, the film being fed longitudinally in conventional manner. Light passing through the sound track falls on a photoelectric cell 22 whose output at terminal 24 constitutes the aforementioned first signal.

Figure 2:
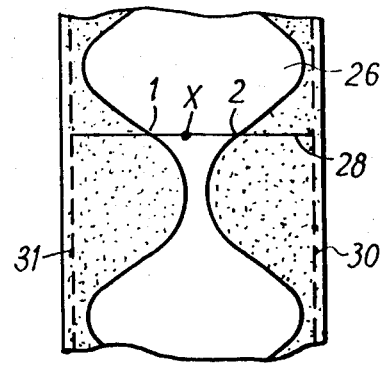
FIG. 2 illustrates a bilateral sound track.

FIG. 2 illustrates a mono bilateral sound track 26 with the line 28 of the scanning spot marked thereacross. The two edges of the track are labelled 1 and 2 where they are traversed by the scanning line 28.

Figure 3:
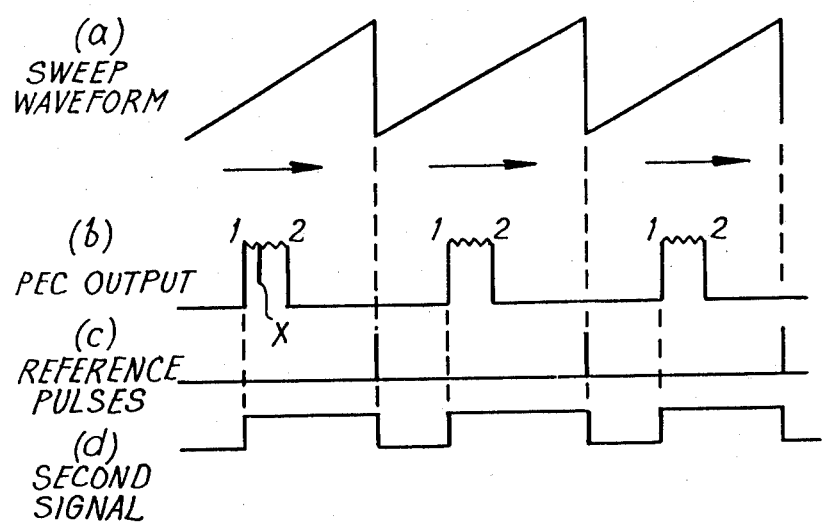
FIG. 3 illustrates waveforms for one way of scanning the sound track.

Referring to FIG. 3, if the sweep waveform (a) applied to the flying-spot scanner is a sawtooth waveform, (with blanking on flyback), the photoelectric cell output will be as shown at (b) with the points 1 and 2 marked in correspondence with FIG. 2 and with fluctuations illustrated to represent the noise on the clear part of the track. Although small fluctuations can be removed in conventional manner by limiting the PEC output, a large fluctuation X, or drop out, caused by a black speck (also labelled X in FIG. 2) on the film, will remain after limiting. The timing generator 14 can also generate timing reference pulses (c), FIG. 3, which are assumed in this example to coincide with the scanning of a hypothetical reference line 30, down the edge of the track 26 in FIG. 2. A second signal (d), FIG. 3, consists of pulses which commence with the black-to-clear transitions 1 of the first signal (b) and terminate with the reference pulses (c), whereby all modulation to the right of the transition 1 is ignored or blanked out, including any drop-out X, the clear-to-black transition 2 and the black area thereafter. The pulses (d) will have a duration representing the track width but which duration is entirely uninfluenced by the fluctuations in signal (b). The width-modulated information of the signal (d) can be converted by integration to amplitude-modulated information which can be envelope-detected in conventional manner.

Figure 4:
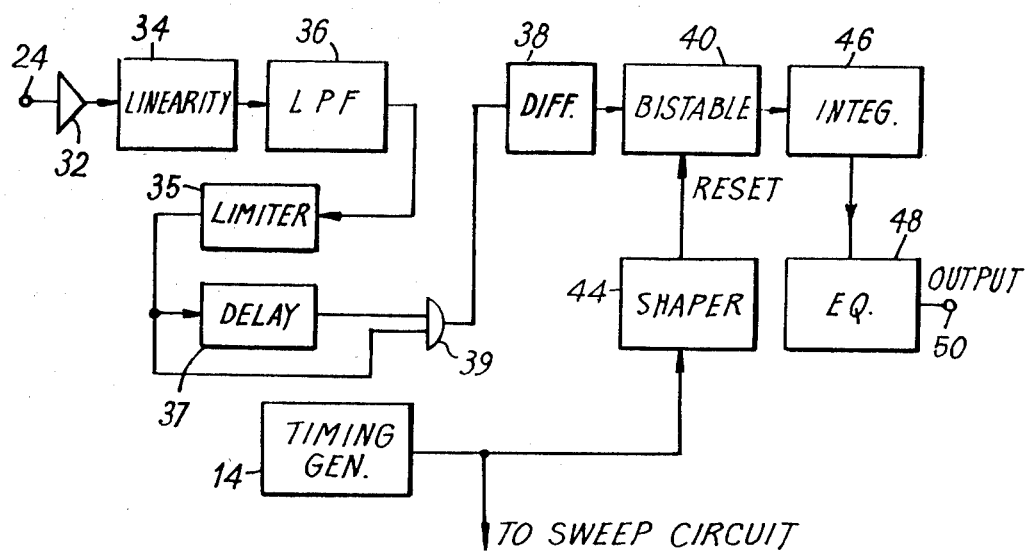
FIG. 4 is a block diagram of a first embodiment of the invention operating in accordance with FIG. 3.

FIG. 4 illustrates an embodiment of the invention operating in accordance with FIG. 3. The signal (b) from terminal 24 is applied through an input amplifier 32 and an optional linearity circuit 34 to a low-pass filter 36. The circuit 34 has any desired frequency response characteristic, e.g. a gamma correction characteristic and can correct for non-linearity of the cell 22 and/or the film 18 to minimize noise and distortion. The design of circuits with non-linear frequency response characteristics has long been standard technology in audio systems. The filter 36 attenuates spurious low-level, high-frequency noise due to grain, dust and abrasion. The filter has a cut-off frequency of several hundred kHz and may be linear or non-linear in action. The output from the filter 36 may be applied to a limiter 35 for the known purpose already mentioned.

The output from the limiter 35 may be applied directly to a differentiator 38, but it is preferred to include further circuitry which deals with possible noise in the black area. Although there may be virtually no black-area noise in a virgin film, this will no longer be the case in a worn film, and a white scratch in the black area could appear erroneously to be the edge 1. For this reason, the output of the limiter 35 is applied to a delay circuit 37 with a very short delay, the outputs of the circuit 37 and of the filter 36 are applied to an AND gate 39 and the output of the gate 39 is applied to the differentiator 38. The output of the gate 39 will not go true (logic level) until the scanning spot has moved off the edge 1 (FIG. 2) and stayed on clear film for the predetermined delay time which is in the region of 1 to 5% of the total scan time, i.e. something less than 1 $\mu$S. In the case of a white fleck in the black area, when the output of the delay circuit 37 goes true, the output of the filter 36 will have reverted to false and the output of the gate 39 will remain false.

The pulses from the differentiator 38 at transitions 1 of FIG. 3 (b) set a bistable circuit 40 which acts as a blanking circuit. The circuit is re-set at the end of the scanning line by the reference pulses (c) provided from the timing generator 14 via a conventional pulse shaper 44 which provides sharp, precisely timed resetting pulses for the circuit 40. The bistable circuit 40 provides the second signal, FIG. 3 (d), and this is applied to an integrator 46 or other suitable pulse-width demodulator. Each pulse causes the output of the integrator to rise to an extent dependent upon the time of integration. i.e. upon the pulse width, and the width-modulated information is thus converted to amplitude-modulated information, in a manner well known per se. The demodulated signal is corrected for slit-loss by a conventional equalizer 48 having a frequency response characteristic with a high-frequency boost and the output signal at terminal 50 is available for audio reproduction.

Figure 4A:
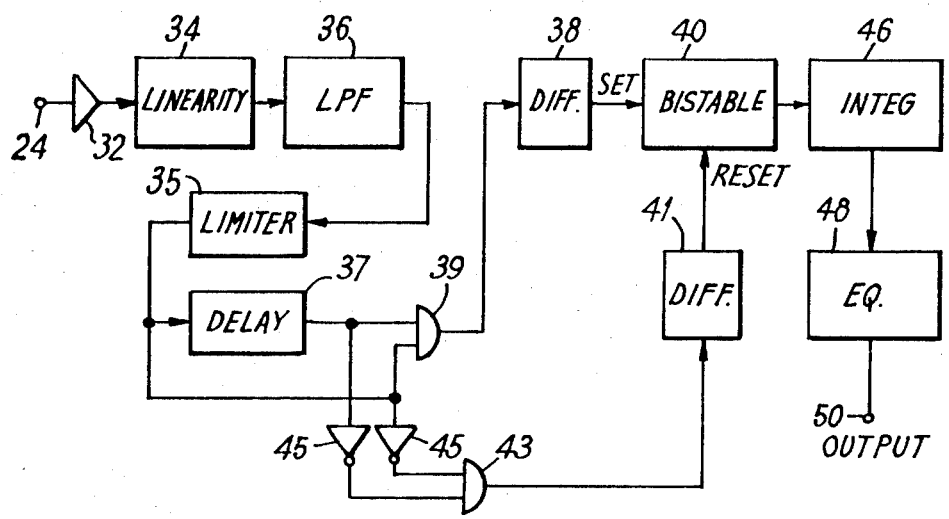
FIG. 4A is a block diagram of a modification of FIG. 4.

FIG. 4A illustrates a modification in which the bistable circuit 40 is not reset from timing pulses. Instead another differentiator 41 provides reset pulses in response to clear-to-black scanned edges. In order to detect such edges and ignore black flecks on the clear area, the outputs from the limiter 35 and delay circuit 37 are applied to another AND gate 43 via inverters 45 and the output of the AND gate 43, which drives the differentiator 41, will go false when the scanning spot has moved on to the black edge 2 (FIG. 2) and been on black for the delay time of circuit 37.

FIG. 5 illustrates the alternative use of a symmetrical triangular scanning waveform (a) to scan in alternate directions across the sound track so that both edges 1 and 2 are utilized. Waveform (b) is the first signal (PEC output) while waveform (c) is waveform (b) differentiated. The bistable circuit 40 is assumed to respond only to positive pulses and is, therefore, set by the pulses shown at (d). The reference pulses (e) are now taken to occur at the start of each scan and, as in FIG. 4, are applied from the generator 14 direct to the reset input of the bistable circuit 40.

FIG. 6 is similar to FIG. 2 but shows a dual-bilateral track layout in which the two halves are separately modulated to form a two-channel stereo sound track 58 with left and right tracks 60 and 62. The scanning line now crosses edges 1, 2, 3 and 4. FIG. 7 shows how these may be scanned using a sawtooth sweep (a). The PEC output appears as at (b). Left and right channel gate signals (c) and (d) can be generated in synchronism with the scanning waveform and used to gate out left and right channel outputs (e) and (f) from the signal (b). Each of the signals (d) and (e) can now be dealt with as already described using the circuitry of FIG. 4, duplicated for the two channels.

Figure 8:
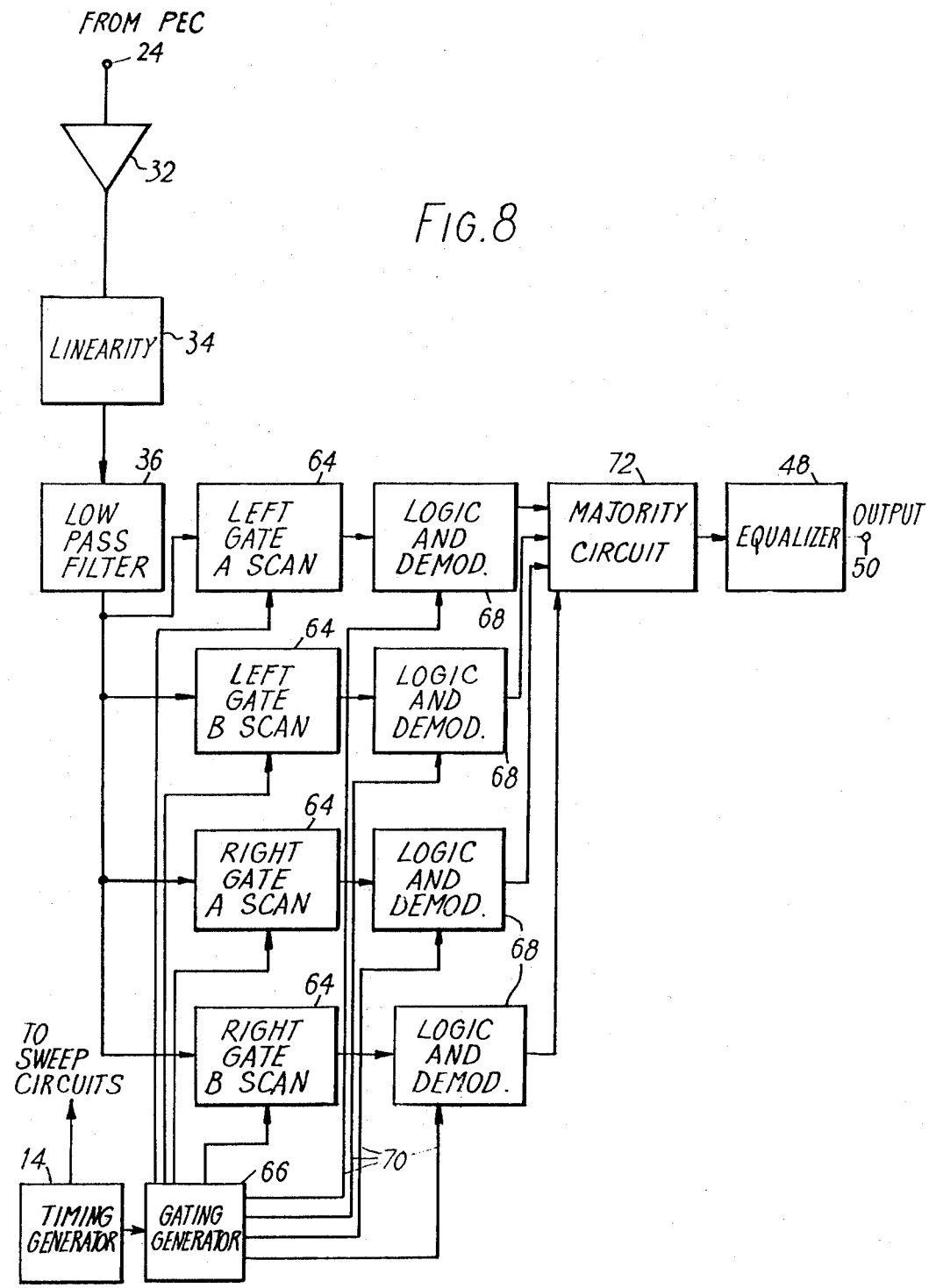
FIG. 8 is a block diagram of part of an embodiment of the invention for use with a dual track.

The system of FIG. 7 can be extended analogously to FIG. 5 and, if the two directions of scan are denoted A and B as in FIG. 5, it is possible to gate out separately the left channel A scan signal, the left channel B scan signal, the right channel A scan signal and the right channel B scan signal. As will be seen, such separate treatment is advantageous for mono dual-bilateral tracks. The circuits required are illustrated in FIG. 8 as four gates 64 fed by four cyclically interleaved gating waveforms provided by a gating generator 66 synchronised to the timing generator 14. The generator produces enabling waveforms for the gates 64 as follows:

LEFT GATE A SCAN—FIRST HALF OF EACH A SCAN

LEFT GATE B SCAN—SECOND HALF OF EACH B SCAN

RIGHT GATE A SCAN—SECOND HALF OF EACH A SCAN

RIGHT GATE B SCAN—FIRST HALF OF EACH B SCAN

The resulting four first signals selected by the gates 64 are applied to separate logic circuits and demodulators 68, each of which consists essentially of elements 38, 40 and 46 of FIG. 4. Elements 37 and 39 can also be included in each circuit 68 or can follow the filter 36 to serve all circuits 68. Each circuit 68 is supplied on a line 70 with the appropriate reference pulse for reset of its bistable. The timings required for the reference pulses for the circuits 68 are as follows:

LEFT A SCAN—HALFWAY POINT OF SCAN (61 FIG. 6)

LEFT B SCAN—LEFT END OF SCAN (31 FIG. 6)

RIGHT A SCAN—RIGHT END OF SCAN (30 FIG. 6)

RIGHT B SCAN—HALFWAY POINT OF SCAN (61 FIG. 6).

For mono dual-bilateral tracks, the circuits 68 provide four redundant signals and these can be applied to a majority circuit 72 which utilizes known techniques to average like signals and leave out of the averaging any signal which does not conform substantially to the other three. The output from the circuit 72 feeds the output terminal 50 via the equalizer 48. The circuit 72 can consist, for example, of a first summing circuit fed with all four signals and a second summing circuit fed selectively with the four signals via four gates, the output of the second summing circuit being connected to the terminal 50 through the equalizer 48. Each gate is controlled by a corresponding comparator which opens the gate when the corresponding one of the four signals does not differ from the output of the first summing circuit by more than a predetermined tolerance.

If the track is a stereo dual-lateral track, then the majority selection technique above cannot be used, since there are effectively only two recordings of each channel. However, the two signals can then be averaged, with some circuit simplification. The gating for each channel can be accomplished by a single gate; similarly one logic and demodulator circuit is used per channel. The left channel gate is opened in the first half of each A scan and the second half of each B scan and feeds the left channel circuit 68. The right channel gate is opened in the first half of each B scan and the second half of each A scan and feeds the right channel circuit 68.

Figure 9:
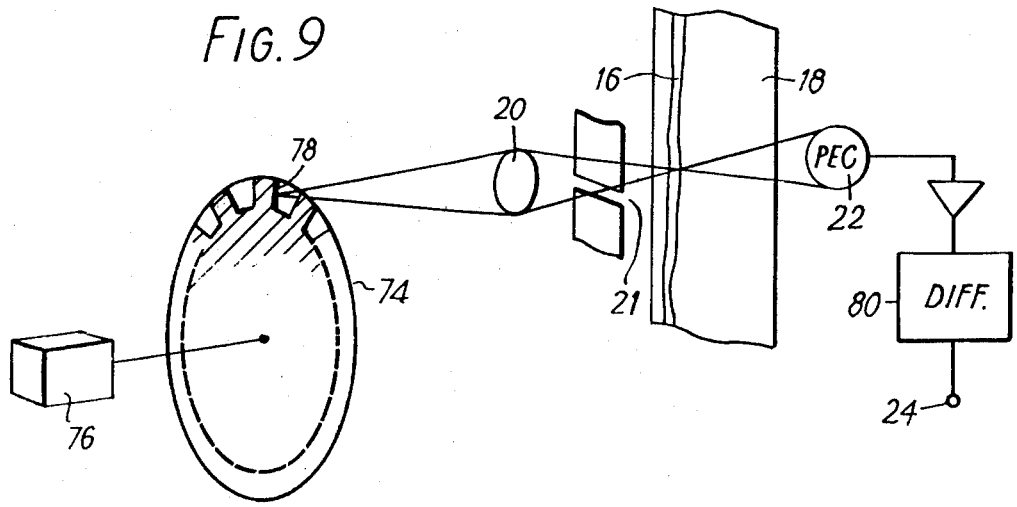
FIG. 9 illustrates a modified scanning system.

FIG. 9 illustrates a mechanical scanning system utilizing a segmented disc which may be photographically prepared, for example. The disc 74, driven by a motor 76, has a segmented edge 78 which may have approximately equal clear and opaque areas and is thus much easier to make than a disc with an array of fine scanning holes or slots. The edge 78 is illuminated by a lamp (not shown) and the image thereof is focused on the track 16 by the lens 20 and fixed slit 21. The edge 78 of each segmentation (of which these may be of the order of several hundred) now moves across the width of the track. Such movement progressively blocks the light on photocell 22 providing a sawtooth output therefrom. By differentiating the output of the photocell 22 in a differentiator 80, the signal at terminal 24 can be made equivalent to that provided by scanning holes, instead of scanning edges.

What is claimed is:

1. A scanning system for reproducing at least one variable area optical sound track, comprising scanning means arranged to scan repeatedly across the width of said at least one variable area sound track to provide a two-level first electrical signal, bistable circuitry for providing at least one second electrical signal, means responsive to said first signal for setting the bistable circuitry, thereby to set the second signal from a first level to a second level, by a transition in the first signal occurring as the scanning means scan from an opaque area to a clear area of said at least one variable area sound track, means for resetting the bistable circuitry, thereby to reset the second signal from the second level to the first level, at reference instants independently of the first signal, and delay means operative to delay setting of the bistable circuitry until a transition in the first signal occurring as the scanning means scan from an opaque area to a clear area of said at least one variable area sound track is followed by maintenance of the first signal at a level corresponding to a clear area of said at least one variable area sound track for a predetermined length of time established by the delay means.

2. A scanning system according to claim 1, wherein the means for resetting the bistable circuitry are responsive to reference pulses synchronised to the scanning means.

3. A scanning system according to claim 2, for use with a bilateral sound track, wherein the scanning means are arranged to scan in alternate directions across the track with the same speed for both directions, the means for setting the bistable circuitry is responsive to each transition in the first signal occurring as the scanning means scan from an opaque area to a clear area of the track and following each such transition the bistable circuitry is reset by the resetting means in accordance with reference pulses symmetrically timed in relation to the scanning such that the durations of second levels of the second signal arising from scanning opposite edges of the sound track are substantially the same.

4. A scanning system according to claim 1, wherein the scanning means comprise means for illuminating the track, means for repeatedly sweeping obturating edges across the path of illumination, photoelectric means responsive to the light passed by the track to provide an electric signal, and means for differentiating the last-said signal to provide said first signal.

5. A scanning system according to claim 1, for use with a single variable area sound track wherein said bistable circuitry comprises a single bistable circuit for producing a second electrical signal and said delay means is operative to delay the setting of said bistable circuit.

* * * * *